June 2, 1970   L. O. HEFLINGER ET AL   3,515,453
ARRANGEMENT OF BEAM MATCHING HOLOGRAPHY
Filed April 18, 1967
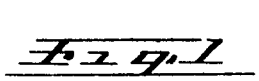
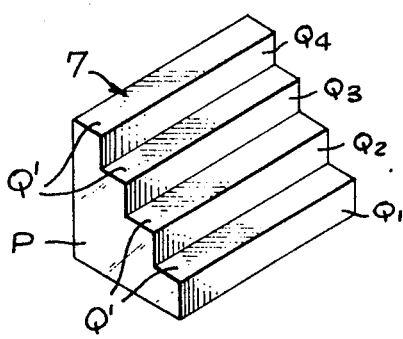
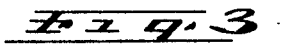
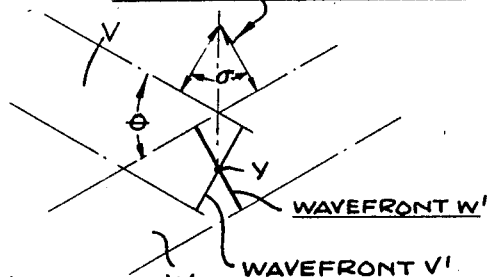
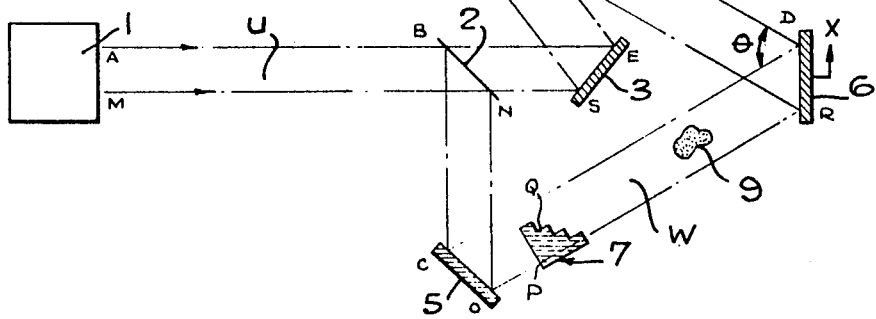
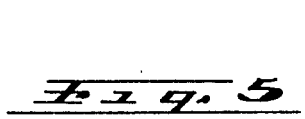
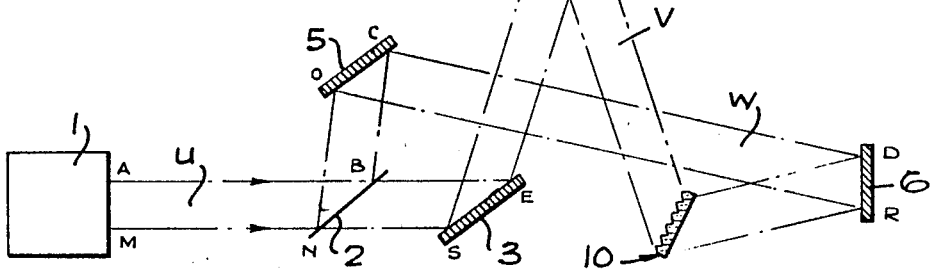
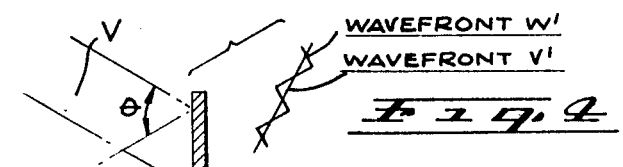
INVENTORS
ROBERT E. BROOKS
LEE O. HEFLINGER
RALPH F. WUERKER
BY Edward Dugas
AGENT

United States Patent Office 3,515,453
Patented June 2, 1970

3,515,453
ARRANGEMENT OF BEAM MATCHING HOLOGRAPHY
Lee O. Heflinger, Torrance, Robert E. Brooks, Redondo Beach, and Ralph F. Wuerker, Palos Verdes Estates, Calif., assignors to TRW Inc., Redondo Beach, Calif., a corporation of Ohio
Filed Apr. 18, 1967, Ser. No. 631,666
Int. Cl. G02b
U.S. Cl. 350—3.5                                    3 Claims

ABSTRACT OF THE DISCLOSURE

With a two-beam holographic arrangement in which a "scene beam" and a "reference beam" simultaneously fall upon a photographic plate at some angle, the optical path length that the beams travel are longer on one side of the beam than on the other. In order to keep the path of the reference beam substantially similar with the path of the scene beam, it is necessary to insert a path length compensator into the reference beam. The compensator used consists of an optically transparent unit having discrete indexes of refraction across at least a pair of its surfaces so as to provide an incremental velocity change for optical rays passing therethrough.

Background of the invention

The holographic process of recording events is generally done by two major techniques. One of these techniques is the single-beam technique, which utilizes a source of coherent radiation in the form of a beam into a portion of which a subject is inserted so as to create an interference pattern that may be recorded on a photographic plate. The other main type of holographic process is the two-beam hologram in which a scene and a reference beam fall upon the photographic plate (commonly called a hologram when exposed) at an angle to one another, and the subject does not obstruct the reference beam. Upon reconstruction, the true and conjugate images are angularly separated. The two-beam arrangement does not provide temporal and spatial matching of the interfering waves, and because of this it must be used with sources of greater coherence. The width of each of the beams is wide enough for the subject to be completely illuminated, and with the beams striking the photographic plate at an angle, it is not possible to achieve equal path lengths for both at all locations on the plate. This mismatching in the optical path lengths of the beams causes a degradation in the resolution of the hologram image produced at the photographic plate when used with light sources of limited coherences. It is therefore highly desirable to have a device which may be inserted into at least one of the beam paths so as to change the path length across the width of the beam such that a closer match is achieved at the surface of the photographic plate.

Summary of the invention

This invention relates generally to holographic apparatus and more particularly relates to a device for improving the matching of beams used in the holography process. In the two-beam holography process, a single source of coherent radiation is generally split into two distinct beams by a beam splitter or other such means, and then directed with the aid of mirrors so that the two beams fall upon a plate or a photographic film so as to create an interference pattern. An optical transparent element having graduated indexes of refraction across two of its surfaces is positioned in the path of one of the beams so as to change the velocity of the light rays passing therethrough, effectively changing the path length across the face of the beam. In this operation, the rays are retarded so that they effectively all travel substantially the same path length to the photographic plate. In the preferred embodiment of the present invention, a stair-step arrangement of optically translucent material having an index of refraction greater than 1 is inserted into one of the beam paths to provide the necessary compensation.

Accordingly, it is a primary object of the present invention to provide a device for insertion in a beam so as to discretely change the path lengths of the beam.

It is a further object of the present invention to provide a novel means for closely matching the wave fronts of beams which intersect each other at an angle.

It is a further object of the present invention to provide an improved arrangement of beam matching for holography.

It is a further object of the present invention to change the path length seen by an optical beam without imparting any substantial bending of the beam.

The foregoing and other objects and features of the present invention will become more apparent and better understood when taken with the following description and the accompanying drawings, throughout which like characters indicate like parts and which drawings form a part of this application.

Description of the drawings

FIG. 1 is a perspective view of the apparatus for improving the beam matching of holography apparatus;

FIG. 2 is a schematic diagram illustrating a preferred arrangement of the path length compensator in place in a two-beam holographic apparatus;

FIG. 3 is a schematic illustrating the path length mismatch of two interfering beams;

FIG. 4 is a schematic diagram illustrating the effect on the wave fronts of two intersecting beams caused by the path length compensator; and FIG. 5 illustrates a second path length compensator in use in a holographic apparatus.

Description of the preferred embodiment

Referring now to FIG. 1, the path length compensator 7, which looks like a plurality of stair-steps, is constructed with one substantially flat plane surface, P, and a plurality of surfaces that are parallel to the surface P and which are at different distances from the surface P. In this particular embodiment, the material that is used to make the compensator 7 is of a homogeneous type having a constant index of refraction such that increases in the length of material causes a proportional decrease in the velocity of radiation passing through the material. A beam having a wave front parallel to the plane surface P, which passes through the compensator 7, will be staggered in velocity or, in other words, will have a wave front which corresponds to the stair-shaped surfaces Q. The surfaces Q' are cut perpendicular to the surfaces Q so as to create a minimum interference with the passage of a beam of radiation travelling substantially perpendicular to the Q surfaces. The compensator 7 may also be made from an integral piece of glass or other translucent material, or it may be made from layers of material sandwiched together so as to form the staircase arrangement. Each of the stairs may have a different width, although best results are achieved when each of the stair-steps has an equal width and a linear incremental increase in their length. The compensator may also be formed with a hollow casing having the desired shape which is filled with liquid or gas, to give the desired index of refraction. It would also be possible to have a plurality of layers of materials having different indexes of refraction sandwiched together to achieve the desired velocity delay of the beam.

Referring now to FIG. 2, a source of substantially coherent radiation such as a laser, 1, provides a beam, U, which is split into two beams, V and W, by means of a beam splitter 2. The W beam is reflected by means of a mirror 5 onto the photographic plate 6, and the beam V is reflected by means of mirror 3 to the mirror 4 and from there to the photographic plate 6, so as to superimpose or interfere with the beam W. The beams interest at an angle $\theta$ with respect to each other. The V beam will be designated the "reference beam" and the W beam will be designated the "scene beam." The mirror positions are chosen so that the path length for the beams V and W are the same to a reasonable approximation. The degree of approximation required depends on the temporal coherence of the light source used. More specifically, path ABCD is the same length as path ABEFD. It can now be observed that in the absence of element 7, the rays following the other side of the beam do not have the same path length; namely, path MNSTR is longer than path MNOR. Element 7, being made of a material having an index of refraction greater than 1, causes the light waves to travel more slowly through element 7 than they would through air or vacuum. The thickness $PQ_1$ is chosen so that the transit time of the lower ray will be lengthened by the right amount to make the lower ray arrive at R at the same time as the upper ray. That is, the optical path length, MNSTR and MNOPQR, are made equal. The stairstep or graduated material length arrangement achieves a similar matching of optical paths for the intermediate rays of the beam. At this point, it may be noted that consideration might be given to smoothing the stairs into a plane as would occur if infinite resolution were desired. This alters the operation of the device in an unacceptable way, for then element 7 would become a prism and would deflect the beam rather than changing the position of the wave front. The subject 9 is positioned in the path of beam W between element 7 and the plate 6.

FIG. 3 illustrates the beams V and W intersecting at their midpoint position Y with their wave fronts designated V' and W', respectively. The total path length mismatch that occurs when the path length of one of the beams is not compensated for is designated $\sigma$. In FIG. 4, a two-step compensator 8 is shown inserted into the beam path of beam W. The wave front V' of beam V remains unchanged, but the wave front W' of beam W now resembles the stairstep configuration of element 8. When wave front W' intersects with wave front V', the path length mismatch is bounded within fixed limits that reoccur across the surface of the photographic plate 6. The path length differences between the beams at the surface of the photographic plate 6 can therefore be improved by the insertion of the path length compensator.

Referring now to FIG. 5, a source of substantially coherent light 1 provides a beam, U, which is split into two beams, V and W, by the beam splitter 2; the beam W is then reflected by means of mirror 5 directly onto the photographic plate 6 and the beam V is reflected by means of mirrors 3 and 4 to the compensation element 10 and from there to the photographic plate 6. In this configuration, the same end result of improving the matching of path lengths over the entire photographic plate is achieved. The added path length required for the lower side of the lower beam V, MNSTR, is obtained by an extra air path rather than a glass or other material path. The element 10 is comprised of a row of small prisms which deflect the beam V into the desired direction and will indirectly provide the required time delay to the beam. A plane mirror cannot be used at this location, for it will not create the desired difference in path lengths for the two sides of the beam. The scene to be photographed is placed in the beam between element 10 and element 6.

What is claimed is:
1. In a holographic apparatus including a separate reference beam and scene beam intersecting each other at an angle of the plane of a photosensitive material, the improvement comprising a path length compensator inserted into the path of one of the beams, wherein said path length compensator is stair-shaped and includes a first surface substantially parallel to the wave front of its associated beam and a plurality of stepped second surfaces, each being substantially parallel to said first surface for retarding the beam by discrete amounts across the wave front, and wherein said path length compensator consists of transparent material and has an index of refraction different from that of the surrounding medium, thereby to improve path length matching of both beams at the plane of the photosensitive material.

2. In a holographic system as defined in claim 1 wherein said path length compensator consists of glass.

3. In a holographic system as defined in claim 1 wherein said path length compensator has first and second surfaces extending across the entire width of is associated beam, thereby to delay portions of the beam each having a substantially rectangular cross-section, each with respect to another.

References Cited

UNITED STATES PATENTS

| | | | |
|---|---|---|---|
| 2,248,638 | 7/1941 | Merton | 350—162 |
| 2,838,600 | 6/1958 | Salinger | 250—234 |

OTHER REFERENCES

Leith and Upatnieks, "Wavefront Reconstruction with Diffused Illumination and 3-D Objects," Journal of the Optical Society of America, vol. 54, No. 11, pp. 1295–1298, November 1964.

Brooks et al., Applied Physics Letters, vol. 7, No. 4, pp. 92–94, August 1965.

Boron & Wolf, Principles of Optics, 3d ed., Pergamon Press, New York, N.Y., pp. 407–412 (1965).

DAVID SCHONBERG, Primary Examiner

R. L. SHERMAN, Assistant Examiner